(12) United States Patent
Endo et al.

(10) Patent No.: US 6,335,916 B1
(45) Date of Patent: Jan. 1, 2002

(54) OPTICAL RECORDING MEDIUM, STAMPER FOR USE TO PRODUCE THE OPTICAL RECORDING MEDIUM, AND METHOD OF PRODUCING THE STAMPER

(75) Inventors: Somei Endo, Miyagi; Masayoshi Kanno, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/492,475

(22) Filed: Jan. 27, 2000

(30) Foreign Application Priority Data

Feb. 9, 1999 (JP) .......................................... 11-031546

(51) Int. Cl.⁷ .............................................. G11B 7/24
(52) U.S. Cl. ................................... 369/275.4; 428/64.4
(58) Field of Search ......................... 369/275.4, 275.2, 369/275.3, 275.1; 428/64.4, 64.1, 64.3; 430/320, 321, 270.13

(56) References Cited

U.S. PATENT DOCUMENTS

| | | | |
|---|---|---|---|
| 5,671,164 A | | 9/1997 | Kanno et al. ................ 364/569 |
| 5,689,495 A | * | 11/1997 | Tsuchiya et al. ......... 369/275.4 |
| 5,822,294 A | * | 10/1998 | Ohtomo et al. .......... 369/275.4 |
| 5,844,883 A | | 12/1998 | Kanno et al. ............. 369/275.4 |
| 5,883,879 A | * | 3/1999 | Fukuoka et al. ......... 369/275.4 |
| 6,016,302 A | * | 1/2000 | Yamatsu et al. ......... 369/275.4 |
| 6,026,072 A | * | 2/2000 | Taira et al. ............... 369/275.3 |
| 6,125,101 A | * | 9/2000 | Kikukawa et al. ....... 369/275.4 |
| 6,128,270 A | * | 10/2000 | Nishikawa ............... 369/275.4 |
| 6,167,013 A | * | 12/2000 | Ando et al. .................... 369/54 |
| 6,243,354 B1 | * | 6/2001 | Terasaki et al. ......... 369/275.4 |
| 6,287,660 B1 | * | 9/2001 | Hosaka et al. ........... 369/275.4 |

* cited by examiner

Primary Examiner—Tan Dinh
(74) Attorney, Agent, or Firm—Oblon, Spivak, McClelland, Maier & Neustadt, P.C.

(57) ABSTRACT

The mark length of each of pits forming together the pit train is made shorter than that of each of pits for a to-be-written signal normalized at the predetermined bit interval T. Also, the mark length of a shortest one of the pits forming together the pit train is set to 64.8 to 80.0% of the shortest mark length for the to-be-written signal normalized at the predetermined bit interval T.

8 Claims, 3 Drawing Sheets

OPTICAL RECORDING MEDIUM, STAMPER FOR USE TO PRODUCE THE OPTICAL RECORDING MEDIUM, AND METHOD OF PRODUCING THE STAMPER

BACKGROUND OF THE INVENTION

1. Field of the Invention

The present invention relates to an optical recording medium having an area where grooves are formed along a recording track and an area where a signal normalized at a predetermined bit interval T is recorded as a pit train. The present invention relates also to a stamper for use to produce the optical recording medium and a method of producing the stamper.

2. Description of the Related Art

As such an optical recording medium, there are available optical discs to and/or from which a signal is optically written and/or read. Such optical discs include a read-only optical disc having preformed in a disc substrate thereof a pit train corresponding to a recording signal, such as a compact disc, laser disc, etc. The mark length of each of pits in the pit train is a length of a to-be-written signal normalized at a predetermined bit interval T. That is, the mark length of each pit in the pit train is an integral multiple of the bit interval T.

Also, the optical discs include a magneto-optical disc to and/or from which a signal is written and/or read under the magneto-optical effect, such as a mini disc, and a phase-change optical disc to and/or from which a signal is written and/or read using the phase change of a recording layer thereof, such as DVD. The optical discs to which a signal can be written, such as the magneto-optical disc and phase-change optical disc, have normally formed in a disc substrate thereof grooves extending along a recording track. The "groove" referred to herein is a so-called guide recess formed along a recording track to enable mainly a tracking servo.

For the tracking servo of the optical disc having grooves formed therein, the push-pull method is applied for example. In the push-pull method, the tracking servo is effected based on a push-pull signal derived from a reflected and diffracted light from the groove. The push-pull signal is provided by detecting a reflected and diffracted light from the groove by means of two photodetectors disposed symmetrically with respect to the track center and calculating a difference between outputs of the two photodetectors.

The process of producing the aforementioned optical disc consists mainly of a step at which a stamper is prepared which is intended for use to produce the optical disc and has a surface shape corresponding to a pit-land pattern including pit trains and grooves which are to be formed in the optical disc (this step will be referred to as "mastering step" hereinafter), a step at which the surface shape of the stamper is replicated to a disc substrate, and a step at which a recording layer, protective layer, etc. are formed on the disc substrate having replicated thereto the surface shape of the stamper.

Normally at the mastering step, a disc-shaped glass substrate having a polished surface is cleaned and dried, and then it is coated with a photoresist. Next, the photoresist is exposed to a laser light to form a latent image corresponding to a pit-land pattern including pit trains and grooves which are to be formed in an intended optical disc. It should be noted that the formation of a latent image by exposure of a photoresist to a laser light is generally called "laser cutting" and an apparatus to form a latent image by exposure of a photoresist to a laser light is generally called "laser cutting equipment".

Thereafter, the photoresist in which the latent image has been formed by the exposure to the laser light is developed to form, on the glass substrate, the pit-land pattern including the pit trains and grooves. A metal layer is formed on the pit-land pattern by electrocasting, and thereafter, the metal layer is separated. The metal layer having replicated thereto the pit-land pattern formed on the glass substrate is thus provided as a master for use to produce an optical recording medium. Note that the master thus produced is generally called "stamper".

There are various requirements for the optical discs. One of such requirements is to provide an optical disc having both a writable area and a read-only area formed therein. To meet this requirement, there has been proposed an optical disc having an area where grooves are formed along a recording track (will be referred to as "groove area" hereinafter) and an area where a recording signal is recorded as a pit train (will be referred to as "pit train area" hereinafter). In this optical disc, the groove area is the writable area while the pit train area is the read-only area.

However, if in such an optical disc, the width of each of pits forming together the pit train formed in the pit train area (will be referred to as "pit width" hereinafter) is equal to that of each of grooves formed in the groove area (will be referred to as "groove width" hereinafter), the amount of a push-pull signal from the pit train area will be nearly a half of that of a push-pull signal from the groove area. Therefore, no stable tracking servo is possible in the pit train area.

On the other hand, if the pit width is increased, the amount of a push-pull signal from the pit train area will be larger. Therefore, when the pit width is sufficiently wider than the groove width, the amount of push-pull signal from the pit train area can be nearly equal to that from the groove area, whereby a stable tracking servo is possible in the pit train area as well.

If the pit width is increased, however, when a signal recorded as a pit train in the pit train area is read, the asymmetry of the read signal will be lower. For example, if a recording signal is 1–7 modulated and the 1–7 modulated signal is recorded as a pit train while the pit width is increased to about a half of the track pitch so that the push-pull signal amount from the pit train area will be approximate to that from the groove area, the asymmetry of a signal read from the pit train will be less than −15%. In this case, it is difficult to read a signal stably.

In such a conventional optical disc having formed therein both the groove area as a writable area and the pit train area as a read-only area, the equalization of the push-pull signal amount from the groove area to that from the pit train area is not compatible with the improvement in asymmetry of a read signal from the pit train area. Note that the equalization of the push-pull signal amount to that from the groove area will be referred to as "equation of push-pull signal amount" in the description made herebelow.

OBJECT AND SUMMARY OF THE INVENTION

It is therefore an object of the present invention to overcome the above-mentioned drawbacks of the prior art by providing an optical recording medium having formed therein both a groove area and a pit train area and in which the equation of push-pull signal amount is compatible with the improvement in asymmetry of a read signal from the put train area.

It is another object of the present invention to provide a stamper for use to produce such an optical recording medium.

It is further object of the present invention to provide a method of producing such a stamper.

According to the present invention, there is provided an optical recording medium having formed therein an area in which grooves are formed along a recording track and an area in which a signal normalized at a predetermined bit interval T is recorded as a pit train, the mark length of each of pits forming together the pit train being shorter than that of each of pits for a to-be-written signal normalized at the predetermined bit interval T; and the mark length of a shortest one of the pits forming together the pit train being 64.8 to 80.0% of the shortest mark length for the to-be-written signal normalized at the predetermined bit interval T.

In the above optical recording medium, the mark length of each of pits forming together the pit train is shorter than that of each of pits for a to-be-written signal normalized at the predetermined bit interval T and the mark length of a shortest one of the pits forming together the pit train is 64.8 to 80.0% of the shortest mark length for the to-be-written signal normalized at the predetermined bit interval T. By thus defining the mark length of each pit, the asymmetry of a read signal from the pit train area will not be lower even when the pit width is increased to equate the push-pull signal amount from the pit train area.

Note that on the assumption that the width of each of pits forming together the pit train is tp and the groove width is tg, they should preferably meet a relation $1.22 < tp/tg \leq 1.84$ in the above optical recording medium. Satisfaction of this relation makes it possible to equate the push-pull signal amount to a sufficient level for a stable tracking servo.

Also according to the present invention, there is provided a stamper for use to produce an optical recording medium having formed therein an area in which grooves are formed along a recording track and an area in which a signal normalized at a predetermined bit interval T is recorded as a pit train, the stamper having a groove pattern being a pit-land pattern corresponding to the grooves and a pit train pattern being a pit-land pattern corresponding to the pit train, the mark length of each of pit patterns forming together the pit train pattern being shorter than that of each of pits for a to-be-written signal normalized at the predetermined bit interval T; and the mark length of a shortest one of the pit patterns forming together the pit train pattern being 64.8 to 80.0% of the shortest mark length for the to-be-written signal normalized at the predetermined bit interval T.

Note that on the assumption that the width of each of pit patterns forming together the pit train pattern is tp and the groove pattern width is tg, they should preferably meet a relation $1.22 < tp/tg \leq 1.84$ in the above stamper.

Also according to the present invention, there is provided a method of producing a stamper for use to produce an optical recording medium having formed therein an area in which grooves are formed along a recording track and an area in which a signal normalized at a predetermined bit interval T is recorded as a pit train, the stamper having a groove pattern being a pit-land pattern corresponding to the grooves and a pit train pattern being a pit-land pattern corresponding to the pit train, the method including the steps of:

making the mark length of each of pit patterns forming together the pit train pattern shorter than that of each of pits for a to-be-written signal normalized at the predetermined bit interval T; and making the mark length of a shortest one of the pit patterns forming together the pit train pattern 64.8 to 80.0% of the shortest mark length for the to-be-written signal normalized at the predetermined bit interval T.

Note that on the assumption that the width of each of pit patterns forming together the pit train pattern is tp and the groove pattern width is tg, they should preferably meet a relation $1.22 < tp/tg \leq 1.84$ in the above method.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

It should be noted that the present invention will be described herebelow concerning a magneto-optical disc conforming to the "MD Data2" Standard for example. However, the present invention is applicable to many types of optical recording media each having formed therein both a groove area and a pit train area, and also to other optical recording media than magneto-optical discs conforming to the "MD Data2" Standard. Note that the MD Data2 Standard covers a magneto-optical disc under development as a magneto-optical disc of a generation next to that to which various types of magneto-optical disc "mini disc (MD)" already commercially available belong.

<Magneto-optical Disc>

The magneto-optical disc which will be described below as the embodiment of the present invention is a one to and/or from which a signal is written and/or read under the magneto-optical effect and in which the push-pull method is applied for tracking servo during the signal write and/or read.

The magneto-optical disc includes a disc substrate formed from polymethyl methacrylate (PMMA), polycarbonate (PC) or the like, a recording layer formed on the disc substrate and to and/or from which a signal is to be written and/or read magneto-optically, and a protective layer formed on the recording layer to protect the latter. In this embodiment, the recording layer consists of, for example, a dielectric layer of SiN or the like, a vertical magnetic recording layer of TeFeCo alloy or the like, a dielectric layer of SiN or the like, and a reflective layer of Al or the like, these layers being stacked one on the other. Also the protective layer is formed by coating on the recording layer with an ultraviolet-curable resin, for example, by the spin coating method. Note that the recording layer and protective layer may arbitrarily be formed and the present invention is not limited to the above-mentioned example.

Figure 1:
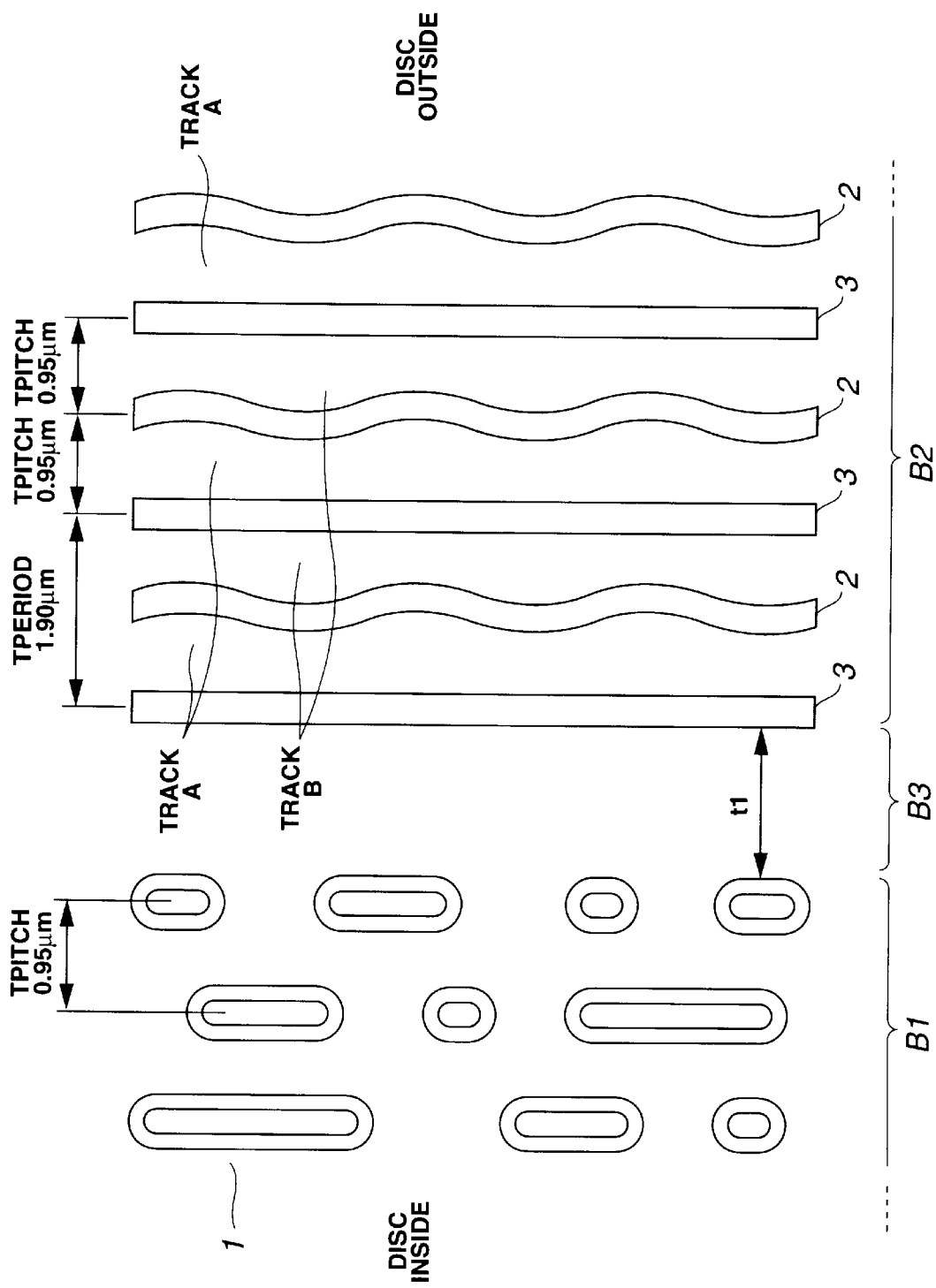
FIG. 1 shows, as enlarged in scale, a portion of the recording area on an embodiment of the optical disc according to the present invention.

Referring now to FIG. 1, there is schematically illustrated, as enlarged in scale, a portion of a recording area on the magneto-optical disc according to the present invention. As shown, a part of the recording area is a read-only area B1 where information such as a table of contents (TOC) and the other are pre-written as pit trains each including multiple pits 1 and the remainder is a writable area B2 where a signal can be written magneto-optically.

The area B1 where the TOC information, etc. are written as the pit trains is a read-only area which will be referred to as "pit train area B1" hereinafter. In the area B2 where a signal can be written magneto-optically, there are formed grooves 2 and 3 as will further be described later. This area will be referred to as "groove area B2" hereinafter.

In the magneto-optical disc, the pit trains formed in the pit train area B1 are formed in the form of a single spiral as a pit pattern corresponding to a signal to be written. That is, there are written in the pit train area B1 TOC information and the other as pit trains formed like the single spiral along the recording track.

In this embodiment, a signal to be recorded in the pit train area B1 is 1–7 modulated and normalized at a predetermined bit interval T. The mark length of each of pits forming together the pit train is made shorter than the mark length resulted when the to-be written signal is normalized at the predetermined interval T. Also, the mark length of a shortest one of the pits forming together the pit train is made 64.8 to 80.0% of the mark length resulted when the to-be written signal is normalized at the predetermined interval T. By thus defining the mark length of each pit, the asymmetry of a read signal from the pit train area B1 will not be lower as will be seen from the experiment results which will be given later, even when the pit width is increased to equate the push-pull signal.

On the other hand, there are provided in the groove area B2 grooves 2 wobbling in a predetermined cycle and straight grooves 3 which do not wobble. Namely, the wobbling groove 2 and straight groove 3 form together a double spiral. The wobbling grooves 2 have added thereto address information by wobbling each groove. It should noted here that the wobbling grooves 2 and straight grooves 3 are formed to have the same width.

In this magneto-optical disc, data is magneto-optically written to each land area between the wobbling groove 2 and straight groove 3. As will be seen from FIG. 1, a land area between a pair of a wobbling groove 2 and a straight groove 3 located nearer than the wobbling groove 3 to the disc inside will be taken herein as a first recording track A, while a land area between a pair of a wobbling groove 2 and a straight groove 3 located nearer than the wobbling groove 2 to the disc outside will be taken herein as a second recording track B. Data is magneto-optically written to the recording tracks A and B.

The wobbling groove 2 is wobbled with an amplitude of ±20 nm at constant intervals. That is, in this magneto-optical disc, one groove of the pair of grooves (namely, the wobbling groove 2) has added thereto address information by wobbling the groove with an amplitude of ±20 nm.

Also in this magneto-optical disc, the pit train area B1 has a track pitch TPitch of 0.95 μm, and also the groove area B2 has a track pitch TPitch of 0.95 μm. The track pitch Tpitch of the pit train area B1 is equivalent to the space between the adjacent pit trains. Namely, in this magneto-optical disc, the space between the adjacent pit trains is 0.95 μm. The track pitch of the groove area B2 is equivalent to the space between the center of the wobbling groove 2 and that of the straight groove 3. Thus in this magneto-optical disc, the space between the center of the wobbling groove 2 and that of the straight groove 3 is 0.95 μm. The space between the centers of the adjacent straight grooves will be referred to as "track period TPeriod" hereinafter. The track period TPeriod is equivalent to double the track pitch TPitch. Thus in this magneto-optical disc, the track period TPeriod is 1.90 μm.

Also, an area between the pit train area B1 and groove area B2 in this magneto-optical disc will be referred to as "transition area B3" hereinafter. In this magneto-optical disc, the disc-radial space between the pit train area B1 and groove area B2, that is, the width t1 of the transition area B3, is 20 μm or less. Owing to this sufficiently small width t1 of the transition area B3, the write/read head will not miss any recording track and can continuously write or read data to or from the magneto-optical disc in a stable manner even if during the write or read, the writing or reading position has been shifted from the pit train area B1 to the groove area B2 or vice versa.

Also the magneto-optical disc is designed such that on the assumption that the width of each of the pits 1 forming together the pit train formed in the pit train area B1 is tp and width of the grooves 2 and 3 formed in the groove area B2 is tg, the relation in width between the pit 1 and pits 2 and 3 is 1.22<tp/tg≦1.84. Thus, the push-pull signal can be equated for a stable tracking servo as will be evident from the experiment results which will be given later.

<Laser Cutting Equipment>

Figure 2:
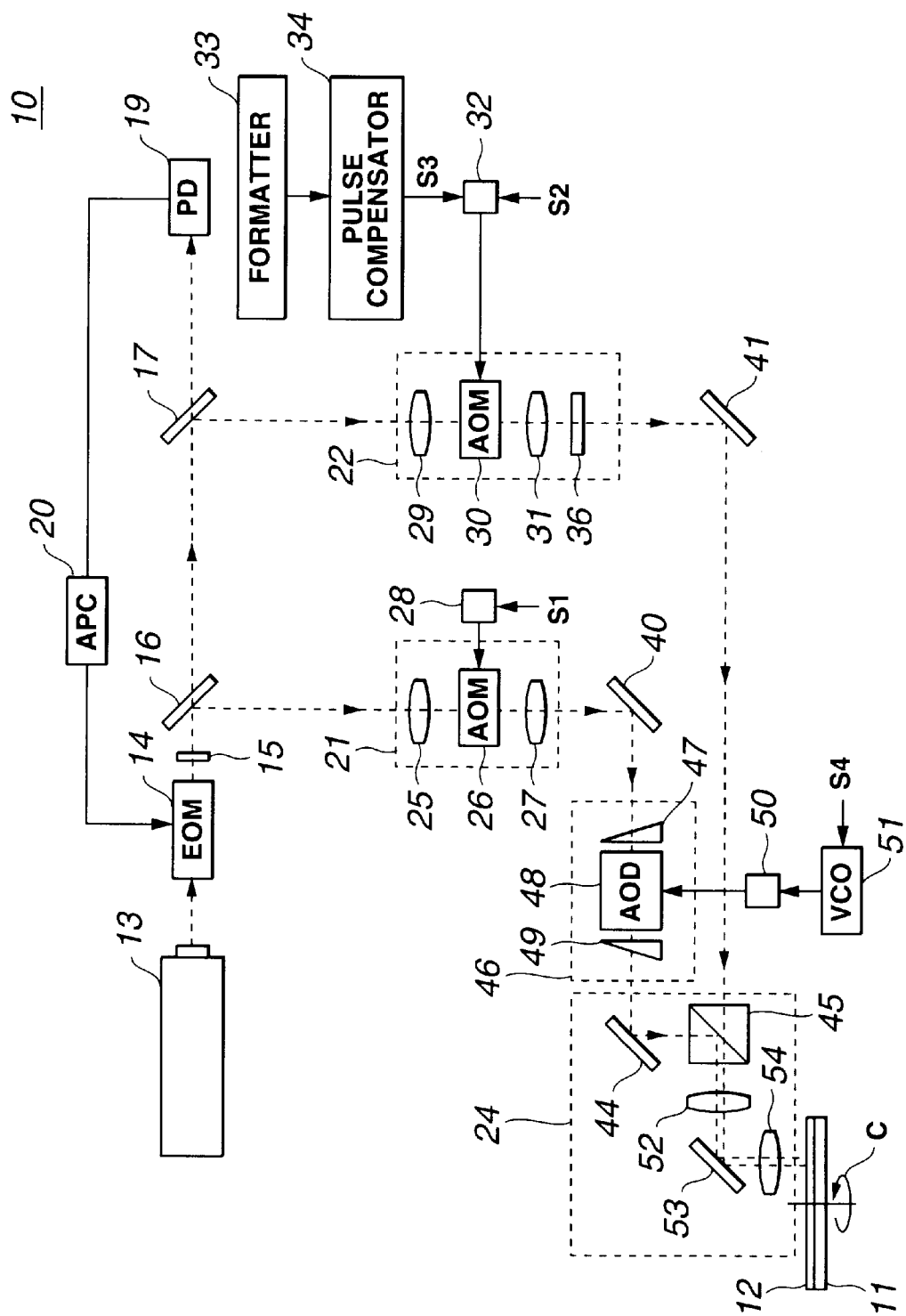
FIG. 2 is a schematic block diagram of an optical system used in an embodiment of the laser cutting equipment used for producing an optical recording medium and a stamper for use to produce the optical recording medium, according to the present invention.

To produce the magneto-optical disc having been described in the above, a laser cutting equipment is used to produce a stamper for use to produce the magneto-optical disc. An embodiment of the laser cutting equipment according to the present invention will be described with reference to FIG. 2 which is a schematic block diagram of an optical system used in the embodiment of the laser cutting equipment. In FIG. 2, the laser cutting equipment is generally indicated with a reference 10.

The laser cutting equipment 10 shown in FIG. 2 is intended for forming a latent image by exposure of a photoresist 12 covering a glass substrate 11. For forming a latent image in the photoresist 12 by means of the laser cutting equipment 10, the glass substrate 11 coated with the photoresist 11 is mounted on a rotation drive unit provided on a movable optical table. When the photoresist 12 is exposed to a laser light, the glass substrate 11 is rotated by the rotation drive unit as indicated with an arrow C while being translated by the movable optical table, so that the photoresist 12 will have the whole surface thereof exposed in a predetermined pattern to the laser light.

The laser cutting equipment 10 is adapted such that the photoresist 12 can be exposed to two beams of exposure laser. Namely, a latent image for the pit 1, a one for the wobbling groove 2 and a one for the straight groove 3 are formed by the use of the two laser beams. In this laser cutting equipment 10, the first exposure laser beam results in a latent image for the wobbling groove 2 while the second exposure laser beam results in latent images for the pit 1 and straight groove 3, respectively.

As shown in FIG. 2, the laser cutting apparatus 10 includes a laser source 13, an electro-optical modulator (EOM) 14 to adjust the intensity of a laser light emitted from the laser source 13, an analyzer 15 disposed on the optical axis of the laser light emitted from the EOM 14, a first beam splitter 16 to reflect, and transmit through it, the laser light having transmitted through the analyzer 15, a second beam splitter 17 to reflect, and transmit through it, the laser light having been transmitted through the first beam splitter 16, a photodetetcor (PD) 19 to detect the laser light having been transmitted through the second beam splitter 17, an auto power controller (APC) 20 to adjust the intensity of the laser light outgoing from the EOM 14 by applying the latter with a signal electric field.

In the laser cutting equipment 10, the laser light emitted from the laser source 13 is first increased in intensity to a predetermined level by the EOM 14 driven by a signal electric field applied from the APC 20, and then incident upon the analyzer 15 which allows only an S-polarized light to pass through it. That is, the laser light having transmitted through the analyzer 15 is an S-polarized light.

Note that the laser source 13 may be any one but should preferably be a one to generate a laser light having a relatively short wavelength. More particularly, the laser source 13 should preferably be a Kr laser to emit a laser light having a wavelength λ of 413 nm or an He-Cd laser to emit a laser light having a wavelength λ of 442 nm, for example.

The S-polarized laser light having been transmitted through the analyzer 15 is reflected by the first beam splitter 16 and transmitted through the. The transmitted laser light through the first beam splitter 16 is further reflected by the second beam splitter 17 and transmitted through the latter. In the laser cutting equipment 10, the reflected laser light from the first beam splitter 16 is used as a first exposure beam while the reflected laser light from the second beam splitter 17 is used as a second exposure beam.

On the other hand, the intensity of the transmitted laser light through the second beam splitter 17 is detected by the photodetector 19 which will thus provide the APC 20 with a signal corresponding to the intensity detected by the photodetector 19. According to the signal from the photodetector 19, the APC 20 will adjust the signal electric field for application to the EOM 14 so that the photodetector 19 will detect a light intensity which is constant at a predetermined level of the signal electric field. Thus, a stable, noiseless laser light is assured so that the intensity of the laser light outgoing from the EOM 14 is constant.

The laser cutting equipment 10 further includes a first intensity modulating optical system 21 to modulate the intensity of the reflected laser light from the first beam splitter 16, a second intensity modulating optical system 22 to modulate the intensity of the laser light reflected by the second beam splitter 17, and an optical system 24 to recombine the intensity-modulated laser beams from the first and second intensity modulating optical systems 21 and 22, respectively, and focus the recombined laser beam onto the photoresist 12.

The first exposure beam from the first beam splitter 16 is guided to the first intensity modulating optical system 21 which will modulate the intensity of the first exposure beam. Similarly, the second exposure beam from the second beam splitter 17 is guided to the second intensity modulating optical system 22 which will modulate the intensity of the second exposure beam.

The first exposure beam incident upon the first intensity modulating optical system 21 is condensed by a condenser 25 and then incident upon an acousto-optical modulator (AOM) 26 which will modulate the intensity of the condensed exposure beam so as to correspond to a desired exposure pattern. The AOM 26 should preferably use an acousto-optical element made of tellurium oxide (TeO$_2$) for example. The first exposure beam having been modulated in intensity by the AOM 26 is collimated by a collimator lens 27 to a parallel light which will outgo from the first intensity modulating optical system 21.

A driver 28 is provided to drive the AOM 26. For exposure of the photoresist 12 to the laser light, a signal corresponding to the desired exposure pattern is supplied to the driver 28 which will drive the AOM 26 based on the supplied signal to modulate the intensity of the first exposure beam.

More specifically, to form in the photoresist 12 a latent image of a groove pattern corresponding to the wobbling groove 2 having a constant depth, a DC signal S1 at a constant level is supplied to the driver 28 which will drive the AOM 26 based on the DC signal S1. Thus, the first exposure beam is modulated in intensity so as to correspond to a desired groove pattern.

The second exposure beam incident upon the second intensity modulating optical system 22 is condensed by a condenser 29 and then incident upon an acousto-optical modulator (AOM) 30 which will modulate the intensity of the condensed exposure beam in a desired exposure pattern. The AOM 30 should preferably use an acousto-optical element made of tellurium oxide (TeO$_2$) for example. The second exposure beam having been modulated in intensity by the AOM 30 is collimated by a collimator lens 31 to a parallel light which will be transmitted through a λ/2-wave plate 36 which rotates the polarized direction of the parallel light through 90 deg., and then outgo from the second intensity modulating optical system 22.

A driver 32 is provided to drive the AOM 30. For exposure of the photoresist 12 to the laser light, a signal corresponding to the desired exposure pattern is supplied to the driver 32 which will drive the AOM 30 according to the supplied signal to modulate the intensity of the second exposure beam.

More specifically, to form in the photoresist 12 a latent image of a groove pattern corresponding to the straight groove 3 having a constant depth, a DC signal S2 at a constant level is supplied to the driver 32 which will drive the AOM 30 according to the DC signal S2. Thus, the second exposure beam is modulated in intensity so as to correspond to a desired groove pattern.

To form in the photoresist 12 a latent image of a 1-modulated pit pattern, a signal S3 corresponding to the 1–7 modulated pit pattern is supplied to the driver 32 via a formatter 33 and pulse compensator 34, and the driver 32 drives the AOM 30 according to the supplied signal S3. Thus, the intensity of the second exposure beam is modulated so as to correspond to the 1–7 modulated pit pattern.

Figures 3A, 3B:
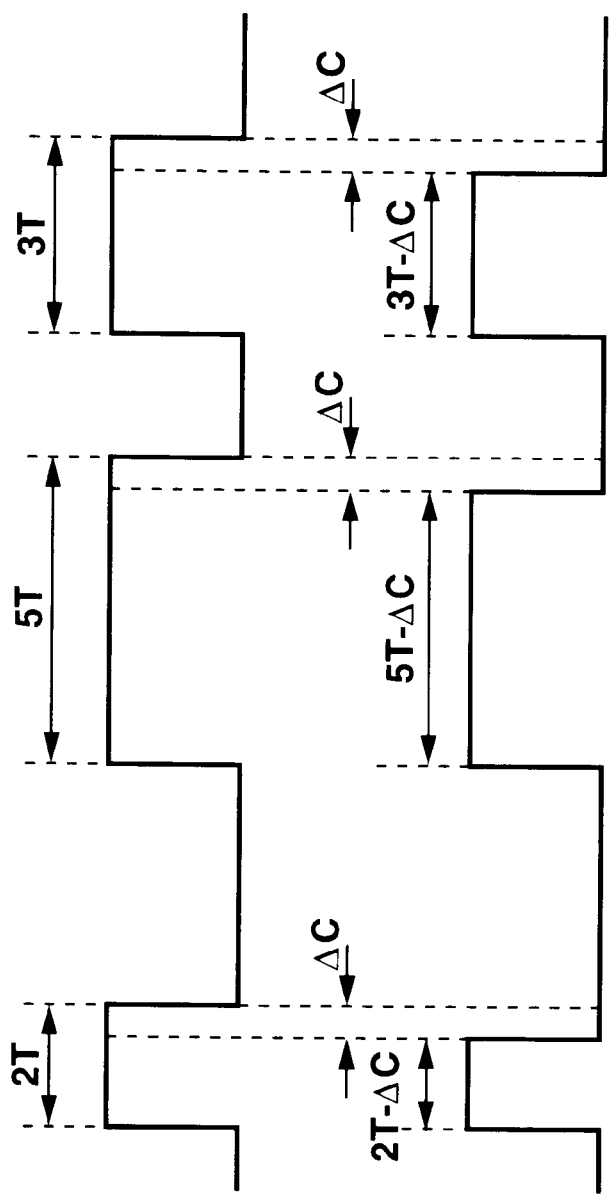
FIG. 3A shows an example of the pulse pattern of a 1–7 modulated signal.
FIG. 3B shows the pulse pattern of a 1–7 modulated corrected signal resulted by mark length correction of the 1–7 modulated signal shown in FIG. 3A.

The formatter 33 modulates a to-be written signal by 1–7 modulation to provide a 1–7 modulated signal. FIG. 3A shows an example of the 1–7 modulated signal. As shown, the 1–7 modulated signal includes a pulse for each of pits forming together a pit train. The length of each pulse is equivalent to the mark length of a to-be written signal normalized at a predetermined bit interval T. Note that the mark length of each of the pits forming together the pit train is an integral multiple of the bit interval T. When the to-be written signal is 1–7 modulated, the mark length of the shortest pit will be 2T.

The 1–7 modulated signal is supplied to the pulse compensator 34 where each pulse will be corrected in length. As shown in FIG. 3B, the pulse compensator 34 will shorten all the pulses included in the 1–7 modulated signal each by a predetermined correction amount ΔC, and provide a signal thus corrected in pulse length (will be referred to as "1–7 modulated corrected signal" hereinafter). The 1–7 modulated corrected signal is supplied to the driver 32 as the signal S3 for the pit pattern as mentioned above.

On the assumption that the mark length of a shortest one of the pits forming together a pit train to be recorded in the magneto-optical disc is A and the shortest mark length of the to-be written signal when normalized at the predetermined bit interval T is B, the ratio A and B will be referred to as "mark length correction ratio" hereinafter. When the to-be written signal is 1–7 modulated as in the above, the mark length correction ratio is a ratio between the length of the shortest pulse included in the 1–7 modulated corrected signal and that of the shortest pulse included in the 1–7 modulated signal, that is, $(2T-\Delta C)/2T$. According to the present invention, the mark length correction ratio is 64.8 to 80.0%.

As in the foregoing, the first exposure beam is modulated in intensity by the first intensity modulating optical system 21, and the second exposure beam is modulated in intensity by the second intensity modulating optical system 22. At this time, the first exposure beam outgoing from the first intensity modulating optical system 21 remains as the S-polarized light, while the second exposure beam outgoing from the second intensity modulating optical system 22 is a P-polarized light because it has the polarized direction thereof rotated 90 deg. when it has been transmitted through the $\lambda/2$-wave plate 36.

The first exposure beam outgoing from the first intensity modulating optical system 21 is reflected by a mirror 40 and guided horizontally and in parallel onto the movable optical table. Similarly, the second exposure beam outgoing from the second intensity modulating optical system 22 is reflected by a mirror 41 and guided horizontally and in parallel onto the movable optical disc.

The first exposure beam reflected by the mirror 40 and guided horizontally and in parallel onto the movable optical disc, is optically deflected by a deflecting optical system 46, reflected by a mirror 44 and thus has the traveling direction thereof turned by 90 deg. and is incident upon a polarizing beam splitter 45. The second exposure beam reflected by the mirror 41 and guided horizontally and in parallel onto the movable optical disc, is incident as it is upon the polarizing beam splitter 45.

The deflecting optical system 46 is provided to polarize the first exposure beam so as to correspond to the wobbling of the wobbling groove 2. That is, the first exposure beam outgoing from the first modulating optical system 21 and incident upon the deflecting optical system 46 is incident, via a wedge prims 47, upon an acousto-optical deflective (AOD) 48 in which it is optically deflected so as to correspond to a desired exposure pattern. The AOD 48 should preferably use an acousto-optical element made of tellurium oxide ($TeO_2$) for example. The first exposure beam deflected by the AOD 48 outgoes from the deflecting optical system 46 via a wedge prism 49.

The above wedge prisms 47 and 49 are provided to allow the first exposure beam to be incident upon the lattice plane of the acousto-optical element of the AOD 48 so as to meet the Bragg condition while maintaining unchanged the horizontal height of the first exposure beam even when the first exposure beam is optically deflected by the AOD 48. In other words, the wedge prism 47, AOD 48 and wedge prism 49 are disposed in such a manner that the lattice plane of the acousto-optical element of the AOD 48 will meet the Bragg condition while maintaining unchanged the horizontal height of the first exposure beam outgoing from the deflecting optical system 46.

A driver 50 is provided to drive the AOD 48. The driver 50 is supplied with a high frequency signal produced by a voltage-controlled oscillator (VCO) 51 and FM modulated with a control signal S4 including address information. For exposure of the photoresist 12 to a laser light, a signal corresponding to a desired exposure pattern is supplied from the VCO 51 to the driver 50, and the AOD 48 is driven by the driver 50 according to the signal, whereby the first exposure beam is optically deflected.

More particularly, when address information is added to a groove by wobbling the groove at a frequency of 88.2 kHz, for example, a high frequency signal of 224 MHz in center frequency, FM modulated with a control signal of 88.2 kHz in frequency, is supplied from the VCO 51 to the driver 50. According to this signal, the driver 50 drives the AOD 48 to change the Bragg angle of the acousto-optical element of the AOD 48, whereby the first exposure beam is optically deflected to correspond to the wobbling at the frequency of 88.2 kHz.

The first exposure beam optically deflected by the deflecting optical system 46 to correspond to the wobbling of the wobbling groove 2, is reflected by the mirror 44 and thus has the traveling direction thereof turned by 90 deg., and then is incident upon the polarizing beam splitter 45.

The polarizing beam splitter 45 reflects the S-polarized light while transmitting the P-polarized light through it. The first exposure beam outgoing from the first modulating optical system 21 is an S-modulated light, while the second exposure beam outgoing from the second modulating optical system 22 is a P-polarized light. Therefore, the first exposure beam is reflected by the polarizing beam splitter 45 while the second exposure beam is transmitted through the polarizing beam splitter 45. Thus, the first exposure beam outgoing from the first modulating optical system 21 and optically deflected by the deflecting optical system 46 and the second exposure beam outgoing from the second modulating optical system 22, are recombined together to travel in the same direction.

The first and second exposure beams recombined together to travel in the same direction and outgoing from the polarizing beam splitter 45, are thickened by a magnifier 52 to have a predetermined beam diameter, reflected by a mirror 53, guided to an objective 54, and then incident, via the objective 54, upon the photoresist 12. Thus, the photoresist 12 will be exposed to the first and second exposure beams and have latent images formed therein. At this time, the glass substrate 11 coated with the photoresist 12 is rotated by the rotating drive unit in the direction of arrow C1 in FIG. 2 as having previously been described, while being translated by the movable optical table so that the whole surface of the photoresist 12 is exposed in a desired pattern. As a result, latent images corresponding to the illuminating orbits of the first and second exposure beams will be formed over the photoresist 12.

The objective 54 intended to condense the exposure beam onto the photoresist 12 should preferably have a larger numerical aperture NA in order to form a finer pit pattern and groove pattern. More specifically, the objective 54 should preferably have a numerical aperture NA of 0.9 or so.

For exposure of the photoresist 12 to the first and second exposure beams, the diameters of the first and second exposure beams are changed by means of the magnifier 52 as necessary to adjust the effective numerical aperture of the objective 54. Thus, the diameters of the spots of the first and second exposure beams condensed on the photoresist 12 can be varied.

More particularly, for forming, in the photoresist 12, latent images for the wobbling groove 2 and straight groove 3 with the first and second exposure beams, the diameters of the first and second exposure beams are increased by the magnifier 52 to increase the effective numerical aperture of the objective 54, so that the spot diameters of the exposure beams are smaller. For forming a latent image for a pit train in the photoresist 12 with the second exposure beam, the beam diameter of the second exposure beam is decreased by the magnifier 52 to decrease the effective numerical aperture of the objective 54, so that the spot diameters of the exposure beams are larger.

The first exposure beam incident upon the polarizing beam splitter 45 is combined with the second exposure beam at the reflective surface of the polarizing beam splitter 45. To this end, the reflective surface of the polarizing beam splitter 45 is adapted to form an appropriate angle of reflection with respect to the traveling direction of an outgoing light resulted from the combination of the first and second exposure beams. Thus, when the first and second exposure beams outgoing from the polarizing beam splitter 45 are condensed onto the image forming plane of the objective (that is, the surface of the photoresist 12), a spot corresponding to the first exposure beam and a one corresponding to the second exposure beam, will be defined at difference positions.

The angle of reflection of the reflective surface of the polarizing beam splitter 54 is set so that the space extending radially of the glass substrate 11, between the spot corresponding to the first exposure beam and that corresponding to the second exposure beam, corresponds to the track pitch TPitch. Thus, a portion of the photoresist 12 for the wobbling groove 2 can be exposed to the first exposure groove while a portion of the photoresist 12 for the straight groove 3 can be exposed to the second exposure beam.

In the laser cutting equipment 10, the direction of the deflecting beam splitter 45 to recombine the first and second exposure beams is adjusted for easy adjustment of the focused positions of the first and second exposure beams. Therefore, the laser cutting equipment 10 can be used to form the wobbling groove 2 and straight groove 3 with little eccentricity.

Since the laser cutting equipment 10 includes the first optical system provided to form a latent image for the wobbling groove 2 and the second optical system provided to form a latent image for the straight grove 3. Therefore, a latent image for the pit 1, a latent image for the wobbling groove 2 and a latent image for the straight groove 3 can be formed only by the laser cutting equipment 10.

That is, in this laser cutting equipment 10, a latent image can be formed for the pit 1. In addition, two exposure beams can be used to form latent images for the wobbling groove 2 and straight groove 3 as a double spiral. In other words, it is possible to form latent images for the wobbling groove 2 and straight groove 3 as a double spiral and a latent image for the pit 1 by the use of only the laser cutting equipment 10.

<Method of Producing Magneto-optical Disc>

An embodiment of the magneto-optical disc producing method according to the present invention will be described in detail below:

To produce a magneto-optical disc, first a stamper is prepared which has pit-land patterns corresponding to pits 1, wobbling grooves 2 and straight grooves 3, respectively.

In this process of stamper preparation, first the glass substrate 11 having the surface thereof polished is washed and dried, and then coated with the photoresist 12. Next, the photoresist 12 is exposed to laser beams in the laser cutting equipment 10 to form therein latent images for the pits 1, wobbling grooves 2 and straight grooves 3, respectively.

Note that for production of an evaluation magneto-optical disc which will be described later, the laser cutting equipment 10 uses as the laser source 13 a Kr laser which generates a laser light having a wavelength λ of 413 nm, and the object 54 having a numerical aperture NA of 0.9 for focusing the first and second exposure beams onto the photoresist 12.

Also note that for production of the evaluation magneto-optical disc, the laser cutting equipment 10 uses, in the first modulating optical system 21 thereof, the condenser 25 having a focal distance of 80 mm and the collimator lens 27 having a focal distance of 120 mm. The laser cutting equipment 10 uses, in the second modulating optical system 22 thereof, the condenser 29 having a focal distance of 80 mm and the collimator lens 31 having a focal distance of 120 mm. The laser cutting equipment 10 uses also the magnifier 52 having a focal distance of 80 mm.

For exposure of the photoresist 12 to laser light in the laser cutting equipment 10, first the photoresist 12 is exposed to the first exposure beam to form therein a latent image for the pits 1, and then the photoresist 12 is exposed to the second exposure beam to form therein latent images for the wobbling grooves 2 and straight grooves 3, respectively. Note that for forming the latent image for the pits 1 in the photoresist 12, the first exposure beam is intercepted by the acousto-optical modulator 26 of the first modulating optical system 21.

To form a latent image for the pits 1 in the photoresist by exposure of the photoresist 12 to the second exposure beam, the second exposure beam is modulated in intensity by the second modulating optical system 22.

More specifically, the signal S3 corresponding to the 1–7 modulated pit pattern is supplied to the driver 32 via the formatter 33 and pulse compensator 34. Based on the signal S3, the acousto-optical modulator 30 is driven by the driver 32, thereby modulating the intensity of the second exposure beam so as to correspond to the 1–7 modulated pit pattern.

The formatter 33 will 1–7 modulate a to-be written signal to provide a 1–7 modulated signal as shown in FIG. 3A. The 1–7 modulated signal is supplied to the pulse compensator 34 in which the length of each pulse included in the 1–7 modulated signal is corrected to provide a 1–7 modulated corrected signal as shown in FIG. 3B. The 1–7 modulated corrected signal is supplied to the driver 34 as a signal S3 corresponding to the pit patten as having previously been described.

The second exposure beam having been modulated in intensity as in the foregoing is focused by the objective 54 onto the photoresist 12. The photoresist 12 is thus exposed to the laser light to form therein the latent image for the pits 1.

Note that for formation of the latent image for the pits 1 by exposure of the photoresist 12 to the laser light, the glass substrate 11 coated with the photoresist 12 is rotated at the predetermined speed while being translated at the predetermined speed.

More specifically, for production of the evaluation magneto-optical disc, the glass substrate 11 is rotated at such a speed that the light spot of the second exposure beam is moved in relation to the photoresist 12 at a linear speed of 1.10 m/sec or 1.94 m/sec. The glass substrate 11 is translated radially thereof by the moving optical disc at a rate of 0.95 μm/rotation (that is, track pitch TPitch).

By exposure of the photoresist 12 to the second exposure beam as in the above, a latent image for the 1–7 modulated pit pattern is formed like a single spiral in the photoresist 12.

After having formed in the photoresist 12 the latent image for the pits 1 as in the foregoing, the photoresist 12 is exposed to the first and second exposure beams to form therein latent images for the wobbling grooves 2 and straight grooves 3, respectively.

To form the latent image for the wobbling grooves 2 in the photoresist 12 by exposing the photoresist 12 to the first exposure beam, the first exposure beam is modulated in intensity by the first modulating optical system 21 and optically deflected by the deflecting optical system 46.

More specifically, first a DC signal S1 at a constant level is supplied to the driver 28 disposed in the first modulating optical system 21. Based on the DC signal S1, the acousto-optical modulator 26 is driven by the driver 28, thereby modulating the intensity of the second exposure beam so as to correspond to the pattern of the wobbling grooves 2. Since the wobbling groove 2 is a continuous groove having a constant depth, the first exposure beam is modulated in intensity to have a constant intensity while a latent image for the wobbling groove 2 is being formed.

Also, the first exposure beam having been modulated in intensity by the first modulating optical system 21 is optically deflected by the deflecting optical system 46. More particularly, a high frequency signal generated by the voltage-controlled oscillator (VCO) 51 is FM modulated and the FM modulated HF signal is supplied to the driver 50. Based on this FM modulated HF signal, the acousto-optical deflector 48 is driven by the driver 50 to change the Bragg angle of the acousto-optical element of the acousto-optical deflector 48, to thereby optically deflect the first exposure beam.

For preparation of an evaluation magneto-optical disc which will be described later, a high frequency of 224 MHz in central frequency is FM modulated with a control signal having a frequency of 88.2 kHz, and supplied from the VCO 51 to the driver 50. Based on this signal, the acousto-optical deflector 48 is driven by the driver 50 to change the Bragg angle of the acousto-optical element of the acousto-optical deflector 48, thereby optically deflecting the first exposure beam so that the focused spot of the first exposure beam on the photoresist 12 will be oscillated at a frequency of 88.2 kHz and amplitude of ±20 nm radially of the glass substrate 11.

The first exposure beam thus intensity-modulated and optically modulated is focused by the objective 54 onto the photoresist 12 which will thus be exposed to the first exposure beam and has formed therein a latent image for the wobbling grooves 2.

Simultaneously with the exposure of the photoresist 12 to the first exposure beam, the photoresist 12 is exposed to the second exposure beam to form therein a latent image for the straight grooves 3.

To form the latent image for the straight grooves 3 in the photoresist 12 by exposure of the photoresist 12 to the second exposure beam, the second exposure beam is modulated in intensity by the second modulating optical system 22.

More specifically, first a DC signal S2 at a constant level is supplied to the driver 32 disposed in the second modulating optical system 22. Based on the DC signal S2, the acousto-optical modulator 30 is driven by the driver 32, thereby modulating the intensity of the second exposure beam so as to correspond to the pattern of the straight grooves 3. Since the straight groove 3 is a continuous groove having a constant depth, the second exposure beam is modulated in intensity to have a constant intensity while a latent image for the straight groove 3 is being formed.

The second exposure beam having thus been modulated in intensity is focused by the objective 54 onto the photoresist 12 in which the latent image for the straight grooves 3 is formed.

For exposure of the photoresist 12 to the laser light to form therein latent images for the wobbling grooves 2 and straight grooves 3, respectively, the glass substrate 11 coated with the photoresist 12 is rotated at the predetermined speed while being translated at the predetermined speed.

More specifically, for production of the evaluation magneto-optical disc, the glass substrate 11 is rotated at such a speed that the spots of the first and second exposure beams are moved in relation to the photoresist 12 at a linear speed of 2.0 m/sec. The glass substrate 11 is translated radially thereof by the moving optical disc at a rate of 1.90 µm/rotation (that is, track period TPeriod).

By exposure of the photoresist 12 to the first and second exposure beams as in the above, a latent image for the wobbling grooves 2 and a latent image for the straight grooves 3 are formed as a double spiral in the photoresist 12.

For use of the laser cutting equipment 10 to form the latent images for the wobbling grooves 2 and straight grooves 3, respectively, the angle of reflection of the reflective surface of the polarizing beam splitter 45 is so set that the space extending radially of the glass substrate 11 between the spot of the first exposure beam and that of the second exposure beam, corresponds to the track pitch TPitch.

By exposing the photoresist 12 to the first and second exposure beams after having thus set the angle of reflection of the reflective plane of the polarizing beam splitter 45, the latent image for the wobbling grooves 2 is formed by the first exposure beam while the latent image for the straight grooves 3 is formed by the second exposure beam. In other words, the wobbling grooves 2 and straight grooves 3 can be positioned in relation to each other by adjusting the direction of the polarizing beam splitter 45.

After having thus formed the latent images in the photoresist 12, the glass substrate 11 is mounted on the turntable of a developing machine in such a manner that the surface of the glass substrate 11 having the photoresist 12 coated thereon comes to the upper position. While the glass substrate 11 is being rotated by rotating the turntable, a developer is dripped onto the photoresist 12 to form the pit-land patterns for the pits 1, wobbling grooves 2 and straight grooves 3, respectively.

Next, an electrically conductive layer of Ni or the like is formed on the pit-land patterns by means of the electroless plating method, the glass substrate 11 having the conductive layer formed thereon is installed on an electrocasting equipment, and a metal layer of Ni or the like is formed to a thickness of 300±5 µm or so on the conductive layer by means of the electroplating method. Thereafter, the metal layer is separated and washed in acetone or the like to remove a remaining photoresist 12 from its surface in which the pit-patterns have been replicated.

As in the above, there is provided a stamper formed from a metal plate in which the pit-land patterns formed in the glass substrate 11 has been replicated and which is used to produce an optical recording medium, that is, a stamper having formed therein the pit-land patterns for the pits 1, wobbling grooves 2 and straight grooves 3, respectively.

Next, the photopolymer method (so-called "2P" method) is used to prepare a disc substrate in which the surface shape of the above-mentioned stamper is replicated.

More specifically, photopolymer is first applied smoothly on the surface of the stamper on which the pit-land patterns are formed, to form a photopolymer layer, and next a base plate is attached to the photopolymer layer with care for no bubbles and dust to go in the photopolymer layer. In this embodiment, the base plate is made of polymethyl methacrylate (of 1.49 in refractive index) having a thickness of 1.2 mm.

Thereafter, ultraviolet rays are irradiated to the photopolymer layer which will thus be set. Then, the stamper is separated to provide a disc substrate (so-called 2P disc) in which the surface shape of the stamper has been replicated.

For accurate replication to the disc substrate of the pit-land patterns formed on the stamper, the 2P method is used to prepare the disc substrate. In the mass production of disc substrates, however, a disc substrate may of course be made by injection molding of a transparent resin such as polymethyl methacrylate, polycarbonate or the like.

Next, a recording layer and protective layer are formed on the disc substrate in which the surface shape of the stamper has been replicated. More specifically, first the sputtering method is used to form a first dielectric layer of SiN or the like on the surface of the disc substrate on which the pit-land patterns have been formed, a vertical magnetic recording layer of TeFeCo alloy or the like on the first dielectric layer, and a second dielectric layer of SiN or the like on the vertical magnetic recording layer. Further, a reflective layer of Al is evaporated on the second dielectric layer. Thus, there is formed a recording layer consisting of the first dielectric layer, vertical magnetic recording layer, second dielectric layer and reflective layer. After that, an ultraviolet-curable resin is applied to the recording layer surface by the spin-coating method, and ultraviolet rays are irradiated to the ultraviolet-curable resin to form a protective layer.

As in the above, a magneto-optical disc is produced.

<Evaluation of Magneto-optical Disc>

A plurality of evaluation magneto-optical discs was produced by the above-mentioned method and evaluated. The evaluation results will be described herebelow:

For evaluation of the magneto-optical discs according to the present invention, the plurality of evaluation magneto-optical discs was produced with the exposure conditions varied to form the latent images for the pits 1, wobbling grooves 2 and straight grooves 3.

More particularly, to produce evaluation magneto-optical discs different in groove width, the power of the first and second exposure beams used to form the latent images for the wobbling grooves 2 and straight grooves 3 was changed around 1.0 mW.

To form the latent images for the wobbling grooves 2 and straight grooves 3, the first and second exposure beams were made equal in power to each other. Therefore, the wobbling grooves 2 was nearly same in width as the straight grooves 3. Therefore, the following description will be made under the assumption that the wobbling and straight grooves 2 and 3 are thus same in width as each other.

To produce evaluation magneto-optical discs for which the mark length was corrected at different ratios, two formatters different in clock frequency from each other were used as the 1-7 modulating formatter 33 (one of which will be taken as a formatter A while the other will be taken as a formatter B).

The formatter A had a clock frequency f of 5.0 MHz (bit interval T of 200 ns). Therefore, when this formatter A was used, a bit interval 2T corresponding to the mark length for the shortest pit) for the 1-7 modulated signal is 400 ns, 4T is 800 ns, and 8T is 1600 ns.

The formatter B had a clock frequency f of 8.82 MHz (bit interval T of 113.4 ns). Therefore, when this formatter B was used, a bit interval 2T corresponding to the mark length for the shortest pit) for the 1-7 modulated signal is 227 ns, 4T is 454 ns, and 8T is 907 ns.

The amount of correction ΔC by the pulse compensator 34 was 80 ns. Therefore, when the formatter A was used, the 1-7 modulated corrected signal includes a pulse of 320 ns resulted from correction of 2T of the 1-7 modulated signal, a pulse of 720 ns resulted from correction of 4T, and a pulse of 1520 ns resulted from correction of 8T. When the formatter B was used, the 1-7 modulated corrected signal includes a pulse of 147 ns resulted from correction of 2T of the 1-7 modulated signal, a pulse of 374 ns resulted from correction of 4T, and a pulse of 827 ns resulted from correction of 8T.

To produce evaluation magneto-optical discs different in pit width from each other, when the formatter A was used, the linear speed for forming the latent image for the pits 1 was 1.10 m/sec and the power of the second exposure beam was changed around 0.8 mW. When the formatter B was used, the linear speed for forming the latent image for the pits 1 was 1.94 m/sec and the power of the second exposure beam was changed around 1.8 mW.

Using the plurality of stampers prepared under the above different exposure conditions, evaluation magneto-optical discs were produced by the 2P method. Note that polymethyl methacrylate of 1.49 in refractive index was used to produce the disc substrate for the evaluation magneto-optical discs.

The evaluation magneto-optical discs produced as in the above were measured for groove width and pit width. The measured groove width values are shown in Table 1, and the measured pit width values are shown in Table 2. Note that the groove width and pit width were measured by scanning pit-land pattern formed in the master by means of a scanning electron microscope (SEM). That is, it was assumed that the pit-land pattern formed in the stamper could be replicated in the disc substrate with a high precision, and the measured groove width and pit width values of the pit-land patterns formed in the stamper were used as those of the grooves and pits formed in the evaluation magneto-optical discs.

TABLE 1

| Exposure beam power | 80% | 90% | 100% | 110% | 120% |
|---|---|---|---|---|---|
| Groove top-width W1 (nm) | 152 | 175 | 201 | 228 | 250 |
| Groove bottom-width W2 (nm) | 348 | 363 | 373 | 382 | 392 |
| Groove width Wg (nm) | 250 | 269 | 287 | 305 | 321 |

Table 1 shows the measured groove width values of each of the evaluation magneto-optical discs produced with the exposure beam power changed during the laser cutting. The beam power of 1.0 mW was taken as 100% in Table 1. In Table 1, the width of the groove top is taken as W1, that of the groove bottom is taken as W2, and the groove width is taken as Wg. The groove width Wg is defined to be (W1+W2)/2.

TABLE 2

|  | When formatter A was used | | | When formatter B was used | | |
|---|---|---|---|---|---|---|
| Exposure beam power | 100% | 120% | 140% | 100% | 120% | 140% |
| Pit top-width W3 (nm) | 310 | 340 | 370 | 330 | 365 | 400 |
| Pit bottom-width W4 (nm) | 450 | 476 | 500 | 480 | 501 | 520 |
| Pit width Wp (nm) | 380 | 408 | 435 | 405 | 433 | 460 |

Table 2 shows the measured pit width values of each of the evaluation magneto-optical discs produced with the exposure beam power changed during the laser cutting and with the formatters A and B selectively used. The beam power of 0.8 mW with the formatter A used was taken as 100%. The beam power of 1.8 mW with the formatter B used was taken as 100%. The width of pit top is taken as W3, that of pit bottom is taken as W4, and the pit width is taken as Wp. The pit width Wp is defined to be (W3+W4)/2.

Also, each of the evaluation magneto-optical discs was measured for push-pull signal amount therefor. For measurement of the push-pull signal amount, an evaluation magneto-optical disc drive for the MD Data2 was used which was provided with an optical pickup in which the laser light had a wavelength λ of 650 nm and the objective had a numerical aperture NA of 0.52.

The measured results showed that in each of all the evaluation magneto-optical discs, a sufficient push-pull signal amount was obtained from the groove area and a safe tracking servo could be done in the groove area.

On the other hand, a sufficient push-pull signal amount was obtained from the pit train area and a safe tracking servo could be done in the pit train area. The MD Data2 standard requires that the push-pull signal amount should be within a range of 0.018/to 0.036. The push-pull signal amount from the pit train area of each of the above-mentioned magneto-optical discs sufficiently meets the requirement in the MD Data2 standard, and a sufficiently safe tracking servo could be made in the pit train area.

More specifically, when the formatter A was used and the mark length was corrected by the pulse compensator 34, the push-pull signal amount from the pit train area was 0.018 to 0.024. When the formatter B was used and the mark length was corrected by the pulse compensator 34, the push-pull signal from the pit train area was 0.020 to 0.027.

Also, a signal recorded as a pit train in the pit train area of each of the evaluation magneto-optical discs was read and jitter of the signal was measured. A time interval analyzer TA320 by Yokogawa Electric Works, Limited was used to measure the signal jitter.

The measurement results showed that in the evaluation magneto-optical discs produced using the formatter A and with the mark length corrected by the pulse compensator 34, the jitter was on the order of 4.5 to 5.5%. Namely, these magneto-optical discs were found to have a good reading characteristic. In the evaluation magneto-optical discs produced with the formatter B and with the mark length corrected by the pulse compensator 34, the jitter was on the order of 5.25 to 5.5%. That is, these magneto-optical discs were found to have a good reading characteristic. In addition, in each of the evaluation magneto-optical discs, the asymmetry of the read signal was about 0 to 15%. Namely, a stable signal reading was possible.

In the evaluation magneto-optical discs produced using the formatter A and with the mark length corrected by the pulse compensator 34, the mark length correction ratio was 320 ns/400 ns=80.0%. In the evaluation magneto-optical discs produced using the formatter B and with the mark length corrected by the pulse compensator 34, the mark length correction ratio was 147 ns/227 ns=64.8%.

In all these evaluation magneto-optical discs, both a stable tracking servo and a good signal reading were possible. This means that by correcting the mark length at a ratio of 64.8 to 80.0% and making the pit width sufficiently larger than the groove width as shown in Tables 1 and 2, a stable tracking servo and good signal reading will be enabled with the magneto-optical disc according to the present invention.

If the pit width is not made larger than the groove width in the magneto-optical discs having both a pit train area and groove area, the amount of push-pull signal from the pit train area will be smaller than that from the groove area and no stable tracking servo is not possible in the pit train area. In the conventional magneto-optical disc in which no mark length correction is done, however, if the pit width is too larger than the groove width, the asymmetry of read signal from the pit train area will be lower and no stable signal reading will be possible.

To verify the above, a plurality of magneto-optical discs each having recorded therein a 1–7 modulated signal as a pit train without the mark length corrected is produced with the pit width and groove width varied as a magneto-optical disc having formed thereon both a pit train and a groove area, separately from the aforementioned evaluation magneto-optical discs, and they were tested for reading characteristic. The test results showed that the pit width was within a range of 269 to 305 nm and that if the groove width is within a range of 250 to 321 nm, the degradation in asymmetry of the read signal will be within a permissible range and thus the 1–7 modulated signal can be read.

The maximum pit width is 305 nm and minimum groove width is 250 nm (thus the maximum pit width/minimum groove width=305 nm/250 nm=1.22). This means that the permissible maximum ratio between pit width and groove width for the conventional magneto-optical disc is 1.22. In other words, in a magneto-optical disc having recorded therein a 1–7 modulated signal as a pit train with the mark length not corrected, the ratio between pit width and groove width cannot be made larger than 1.22. In a magneto-optical disc having the ratio between pit width and groove width of 1.22, the push-pull signal amount from the pit train area was on the order of 0.010 and no stable tracking servo was possible.

On the other hand, of the aforementioned evaluation magneto-optical discs produced according to the present invention, ones produced using the formatter A and with the mark length corrected by the pulse compensator 34 were designed to have a maximum pit width of 435 nm, minimum groove width of 250 nm and the ratio between the maximum pit width and minimum groove width=435 nm/250 nm=1.74. That is, in the evaluation magneto-optical discs produced using the formatter A and with the mark length corrected by the pulse compensator 34, the degradation in asymmetry of read signal was small and stable signal reading was possible even with the ratio between pit width and groove width increased up to 1.74.

Of the aforementioned evaluation magneto-optical discs produced according to the present invention, ones produced using the formatter B and with the mark length corrected by the pulse compensator 34 were designed to have a maximum pit width of 460 nm, minimum groove width of 250 nm and the ratio between the maximum pit width and minimum groove width=460 nm/250 nm=1.84. That is, in the evaluation magneto-optical discs produced using the formatter B and with the mark length corrected by the pulse compensator 34, the degradation in asymmetry of read signal was small and stable signal reading was possible even with the ratio between pit width and groove width increased up to 1.84.

According to the present invention, the pit width can be made larger than in the conventional magneto-optical disc, and more specifically, the ratio between pit width and groove width can be increased up to 1.84. That is, according to the present invention, the mark length of the pit can be corrected to make the pit width larger than that in the conventional magneto-optical disc and thus pits and grooves can be pre-formatted which meet the requirement given by the following relation (1):

$$1.22 < (\text{pit width/groove width}) \leq 1.84 \quad (1)$$

In the foregoing, the present invention has been described taking an example in which the to-be written signal is 1–7 modulated. However, it should be noted that the present invention is not limited to this 1–7 modulation. Therefore, the to-be written signal may be EFM signal, EFM+ signal, etc. for example.

As having been described in the foregoing, the present invention provides an optical recording medium having formed therein both a groove area and a pit train area and in which the equation of push-pull signal amount can be attained without any degradation in asymmetry of a read signal from the put train area. Therefore, in the optical recording medium having formed therein both the groove and pit train areas according to the present invention, a stable tracking servo is compatible with a good signal reading.

What is claimed is:

1. An optical recording medium having formed therein an area in which grooves are formed along a recording track and an area in which a signal normalized at a predetermined bit interval T is recorded as a pit train, the mark length of each of pits forming together the pit train being shorter than that of each of pits for a to-be-written signal normalized at the predetermined bit interval T; and the mark length of a shortest one of the pits forming together the pit train being 64.8 to 80.0% of the shortest mark length for the to-be-written signal normalized at the predetermined bit interval T.

2. The optical recording medium as set forth in claim 1, wherein

Note that on the assumption that the width of each of pits forming together the pit train is tp and the groove width is tg, they meet a relation $1.22 < tp/tg \leq 1.84$.

3. The optical recording medium as set forth in claim 1, wherein the push-pull method is applied for tracking servo.

4. A stamper for use to produce an optical recording medium having formed therein an area in which grooves are formed along a recording track and an area in which a signal normalized at a predetermined bit interval T is recorded as a pit train, the stamper having a groove pattern being a pit-land pattern corresponding to the grooves and a pit train pattern being a pit-land pattern corresponding to the pit train, the mark length of each of pit patterns forming together the pit train pattern being shorter than that of each of pits for a to-be-written signal normalized at the predetermined bit interval T; and the mark length of a shortest one of the pit patterns forming together the pit train pattern being 64.8 to 80.0% of the shortest mark length for the to-be-written signal normalized at the predetermined bit interval T.

5. The stamper as set forth in claim 4, wherein on the assumption that the width of each of pit patterns forming together the pit train pattern is tp and the groove pattern width is tg, they should preferably meet a relation $1.22 < tp/tg \leq 1.84$.

6. The stamper as set forth in claim 4, wherein the push-pull method is applied for tracking servo of the optical recording medium.

7. A method of producing a stamper for use to produce an optical recording medium having formed therein an area in which grooves are formed along a recording track and an area in which a signal normalized at a predetermined bit interval T is recorded as a pit train, the stamper having a groove pattern being a pit-land pattern corresponding to the grooves and a pit train pattern being a pit-land pattern corresponding to the pit train, the method including the steps of:

making the mark length of each of pit patterns forming together the pit train pattern shorter than that of each of pits for a to-be-written signal normalized at the predetermined bit interval T; and making the mark length of a shortest one of the pit patterns forming together the pit train pattern 64.8 to 80.0% of the shortest mark length for the to-be-written signal normalized at the predetermined bit interval T.

8. The method as set forth in claim 7, wherein on the assumption that the width of each of pit patterns forming together the pit train pattern is tp and the groove pattern width is tg, they should preferably meet a relation $1.22 < tp/tg \leq 1.84$.

* * * * *